US010616271B2

(12) United States Patent  
O'Connell et al.

(10) Patent No.: US 10,616,271 B2  
(45) Date of Patent: Apr. 7, 2020

(54) SYSTEM AND METHOD FOR MITIGATING DISTRIBUTED DENIAL OF SERVICE ATTACKS

(71) Applicant: MICROSEMI FREQUENCY AND TIME CORPORATION, Aliso Viejo, CA (US)

(72) Inventors: Anne Gerardine O'Connell, Rochestown (IE); Yves Cognet, Redwood Shores, CA (US)

(73) Assignee: MICROSEMI FREQUENCY AND TIME CORPORATION, Chandler, AZ (US)

( * ) Notice: Subject to any disclaimer, the term of this patent is extended or adjusted under 35 U.S.C. 154(b) by 214 days.

(21) Appl. No.: 15/839,771

(22) Filed: Dec. 12, 2017

(65) Prior Publication Data

US 2018/0191773 A1 Jul. 5, 2018

Related U.S. Application Data

(60) Provisional application No. 62/441,951, filed on Jan. 3, 2017.

(51) Int. Cl.
*H04L 29/06* (2006.01)
*H04L 12/815* (2013.01)
(Continued)

(52) U.S. Cl.
CPC ........ *H04L 63/1458* (2013.01); *H04L 47/225* (2013.01); *H04L 61/6063* (2013.01);
(Continued)

(58) Field of Classification Search
CPC . H04L 63/1458; H04L 63/1425; H04L 63/22; H04L 61/6063; H04L 47/2441; H04L 47/225; H04L 2463/141
(Continued)

(56) References Cited

U.S. PATENT DOCUMENTS 7,921,462 B2   4/2011   Rooney et al.
9,386,036 B2   7/2016   Kim et al.
(Continued)

OTHER PUBLICATIONS

Kumarasamy, et al., "An Efficient Detection Mechanism for Distributed Denial of Service (DDoS) Attack", Computing Research Repository (CoRR)—ARXIV 1302.5158, Feb. 21, 2013.
(Continued)

*Primary Examiner* — Kambiz Zand
*Assistant Examiner* — Benjamin A Kaplan
(74) *Attorney, Agent, or Firm* — Glass and Associates; Kenneth Glass

(57) ABSTRACT

A method and associated system for mitigating a Distributed Denial of Service (DDoS) attack on a target device including, receiving a plurality of data packets at a mitigation device, counting a number of occurrences of each destination address signature within each of a plurality of consecutive data packet windows, classifying each data packet window of the plurality of consecutive data packet windows as a potential attack window if the number of occurrences of any one destination address signature within the data packet window exceeds a destination address signature threshold value. The method further includes, determining a total number of potential attack windows within a sliding time window and limiting the transmission of the plurality of data packets from the mitigation device if a total number of potential attack windows within the sliding time window exceeds a potential attack window threshold value.

31 Claims, 6 Drawing Sheets

(51) Int. Cl.
 *H04L 29/12* (2006.01)
 *H04L 12/851* (2013.01)

(52) U.S. Cl.
 CPC .......... *H04L 63/1425* (2013.01); *H04L 69/22* (2013.01); *H04L 47/2441* (2013.01); *H04L 2463/141* (2013.01)

(58) Field of Classification Search
 USPC .......................................................... 726/23
 See application file for complete search history.

(56) References Cited

U.S. PATENT DOCUMENTS

| | | | |
|---|---|---|---|
| 2004/0062199 A1* | 4/2004 | Lau | H04L 1/20 370/230 |
| 2006/0010389 A1 | 1/2006 | Rooney et al. | |
| 2011/0107412 A1 | 5/2011 | Lee et al. | |
| 2014/0283030 A1* | 9/2014 | Moore | H04L 63/0236 726/22 |
| 2016/0080413 A1 | 3/2016 | Smith et al. | |
| 2018/0152474 A1* | 5/2018 | Winquist | H04L 63/1458 |

OTHER PUBLICATIONS

Kuppusamy, et al., "An Effective Prevention of Attacks Using Gi Time Frequency Algorithm Under DDOS", International Journal of Network Security & Its Applications (IJNSA), Nov. 2011, pp. 1-9, vol. 3, No. 6, Nov. 2011, pp. 1-9.

Li, "Detecting DDoS Attacks Against Web Server via Lightweight TCM-KNN Algorithm", SiggComm 2008; Institute of Computing Technology, Chinese Academy of Sciences, Beijing China 100190; Research Institution of China Mobile, Beijing China 100053, Jan. 2008, p. 497.

Priyadharshini, et al., "Prevention of DDOS Attacks using New Cracking Algorithm", International Journal of Engineering Research and Applications, May-Jun. 2012, pp. 2263-2267, vol. 2, Issue 3, May-Jun. 2012, pp. 2263-2267.

* cited by examiner

600

RECEIVING A PLURALITY OF DATA PACKETS AT A MITIGATION DEVICE, EACH OF THE PLURALITY OF DATA PACKETS COMPRISING AT LEAST A DESTINATION ADDRESS SIGNATURE AND THE DESTINATION ADDRESS SIGNATURE COMPRISING A DATA PACKET DESTINATION ADDRESS IDENTIFYING A TARGET DEVICE
605

↓

COUNTING A NUMBER OF OCCURRENCES OF EACH DESTINATION ADDRESS SIGNATURE WITHIN EACH OF A PLURALITY OF CONSECUTIVE DATA PACKET WINDOWS
610

↓

CLASSIFYING EACH DATA PACKET WINDOW OF THE PLURALITY OF CONSECUTIVE DATA PACKET WINDOWS AS A POTENTIAL ATTACK WINDOW IF THE NUMBER OF OCCURRENCES OF ANY ONE DESTINATION ADDRESS SIGNATURE WITHIN THE DATA PACKET WINDOW EXCEEDS A DESTINATION ADDRESS SIGNATURE THRESHOLD VALUE
615

↓

DETERMINING A TOTAL NUMBER OF POTENTIAL ATTACK WINDOWS WITHIN A SLIDING TIME WINDOW
620

↓

LIMITING THE TRANSMISSION OF THE PLURALITY OF DATA PACKETS FROM THE MITIGATION DEVICE IF THE TOTAL NUMBER OF POTENTIAL ATTACK WINDOWS WITHIN THE SLIDING TIME WINDOW EXCEEDS A POTENTIAL ATTACK WINDOW THRESHOLD VALUE
625

FIG. 6

SYSTEM AND METHOD FOR MITIGATING DISTRIBUTED DENIAL OF SERVICE ATTACKS

BACKGROUND OF THE INVENTION

A Distributed Denial of Service (DDoS) attack occurs when a target device, such as a network server or website, can no longer service legitimate requests because it is overwhelmed with malicious requests initiated from one or more attacking devices.

As shown in FIG. 1, a possible DDoS attack infrastructure 100 may include an attacker 105 in communication with a plurality of vulnerable servers 110, 115, 120, 125 and a target device 130 in communication with the plurality of vulnerable servers 110, 115, 120, 125. A DDoS attack on the target device 130 may be initiated by the attacker 105 through the vulnerable servers 110, 115, 120, 125 in an attempt to render the target device 130 unavailable to an intended user, such as preventing access by a user to a web site or a network server.

Two broad classes of DDoS attacks are known to include volumetric DDoS attacks and application layer DDoS attacks. Volumetric DDoS attacks are focused on filling up the network bandwidth of the target device 130. In a volumetric DDoS attack, the attacker 105 spoofs its source address, thereby hiding the identity of the attacker 105, and instead uses the source addresses of multiple vulnerable servers 110, 115, 120, 125 to send data packets to the target device 130. The attacker 105 may initiate a volumetric DDoS attack by sending multiple Transmission Control Protocol (TCP) or User Datagram Protocol (UDP) packets to the vulnerable servers 110, 115, 120, 125. The vulnerable servers 110, 115, 120, 125 respond by replying to the target device 130, thereby quickly overwhelming the target device 130. In an application layer DDoS attack, the attacker 105 may send a rapid succession of connection requests from spoofed source addresses of the vulnerable servers 110, 115, 120, 125 requesting to open a connection with the target device 130. The target device 130 then sends request acknowledgements to each of the vulnerable servers 110, 115, 120, 125, however, the vulnerable servers 110, 115, 120, 125 did not initiate the connection request and therefore never reply with an acknowledgement. As the pending acknowledgements from the vulnerable servers 110, 115, 120, 125 increase, eventually the target device 130 is no longer able to accept any new connections from legitimate sources.

Systems and methods are known for mitigating DDoS attacks by identifying attackers based upon the spoofed source address in the data packets received at the target device 130 and either blocking or rate limiting the data packets based upon the source address. However, the data packets may include such a wide variety of source addresses spoofed by the attacker 105, that it is generally impossible to block just the malicious data traffic, which is indistinguishable from the legitimate data traffic.

Accordingly, what is needed in the art is an improved system and method for mitigating Distributed Denial of Service (DDoS) attacks.

SUMMARY OF THE INVENTION

In various embodiments, the present invention provides a system and method for mitigating a Distributed Denial of Service (DDoS) attack on a target, such as a network server or an internet website.

In one embodiment, the present invention provides a method for mitigating a Distributed Denial of Service (DDoS) attack a target device, which includes, receiving a plurality of data packets at a mitigation device, each of the plurality of data packets comprising a destination address signature and the destination address signature comprising at least a data packet destination address identifying the target device, counting a number of occurrences of each destination address signature within each of a plurality of data packet windows and classifying each data packet window of the plurality of consecutive data packet windows as a potential attack window if the number of occurrences of any one destination address signature within the data packet window exceeds a destination address signature threshold value. The method further includes, determining a total number of potential attack windows within a sliding time window and limiting the transmission of the plurality of data packets from the mitigation device if the total number of potential attack windows within the sliding time window exceeds a potential attack window threshold value.

In an additional embodiment, the destination address signature may further include a protocol identifier to identify the transmission protocol being implemented in the data packet. In various embodiments, the protocol identifier may be selected from a Transmission Control Protocol (TCP) identifier and a User Datagram Protocol (UDP) identifier.

In one embodiment, limiting the transmission of the plurality of data packets from the mitigation device may include, dropping the data packets at the mitigation device identified by the packet destination address signature having a number of occurrences that exceeds the destination address signature threshold value.

In an additional embodiment, the present invention provides a system for mitigating a Distributed Denial of Service (DDoS) attack on a target device, which includes, one or more modules implemented at least partially in hardware, the one or more modules configured to perform operations comprising, receiving a plurality of data packets at a mitigation device, each of the plurality of data packets comprising a destination address signature and the destination address signature comprising at least a data packet destination address identifying the target device, counting a number of occurrences of each destination address signature within each of a plurality of consecutive data packet windows and classifying each data packet window of the plurality of consecutive data packet windows as a potential attack window if the number of occurrences of any one destination address signature within the data packet window exceeds a destination address signature threshold value. The system further includes, one or more modules configured to perform operations comprising, determining a total number of potential attack windows within a sliding time window and limiting the reception of the plurality of data packets at the mitigation device if the total number of potential attack windows within the sliding time window exceeds a potential attack window threshold value.

In another embodiment, the present invention provides one or more non-transitory computer-readable media having computer-executable instructions for performing a method of running a software program on a computing device for mitigating a Distributed Denial of Service (DDoS) attack on a target device, the computing device operating under an operating system, the method including issuing instructions from the software program, which includes, receiving a plurality of data packets at a mitigation device, each of the plurality of data packets comprising a destination address signature and the destination address signature comprising at least a data packet destination address identifying a target device, counting a number of occurrences of each destination address signature within each of a plurality of consecutive data packet windows and classifying each data packet window of the plurality of consecutive data packet windows as a potential attack window if the number of occurrences of any one destination address signature within the data packet window exceeds a destination address signature threshold value. The method further includes issuing instructions from the software program for determining a total number of potential attack windows within a sliding time window and for limiting the reception of the plurality of data packets at the mitigation device if the total number of potential attack windows within the sliding time window exceeds a potential attack window threshold value.

The present invention mitigates a DDoS attack on a target device by rate limiting the data packets that are received at the target device based upon the destination address signature of data packets received at the mitigation device. As such, the present invention provides an improved system and method for mitigating DDoS attacks that relies on the data packet destination addresses, thereby overcoming the deficiencies in the known systems and methods that depend upon the use of source addresses that may be spoofed by an attacker.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 6 is a flow diagram illustrating a method for mitigating a DDoS attack, in accordance with an embodiment of the present invention.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments, the present invention provides a system and method for mitigating a Distributed Denial of Service (DDoS) attack on a target, such as a network server.

Figure 1:
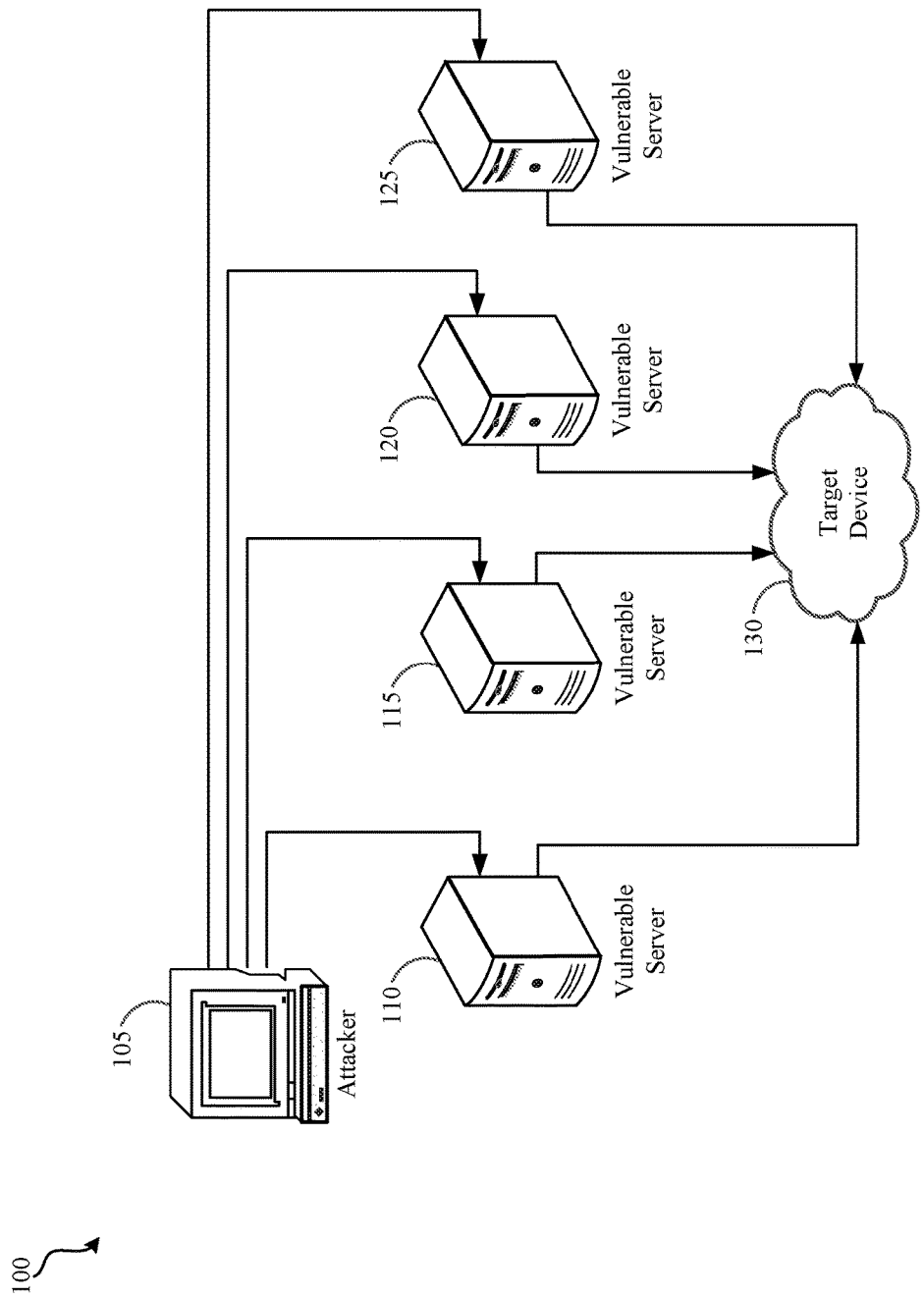
FIG. 1 is a diagram illustrating an exemplary Distributed Denial of Service (DDoS) attack network infrastructure as is known in the art.
Figure 2:
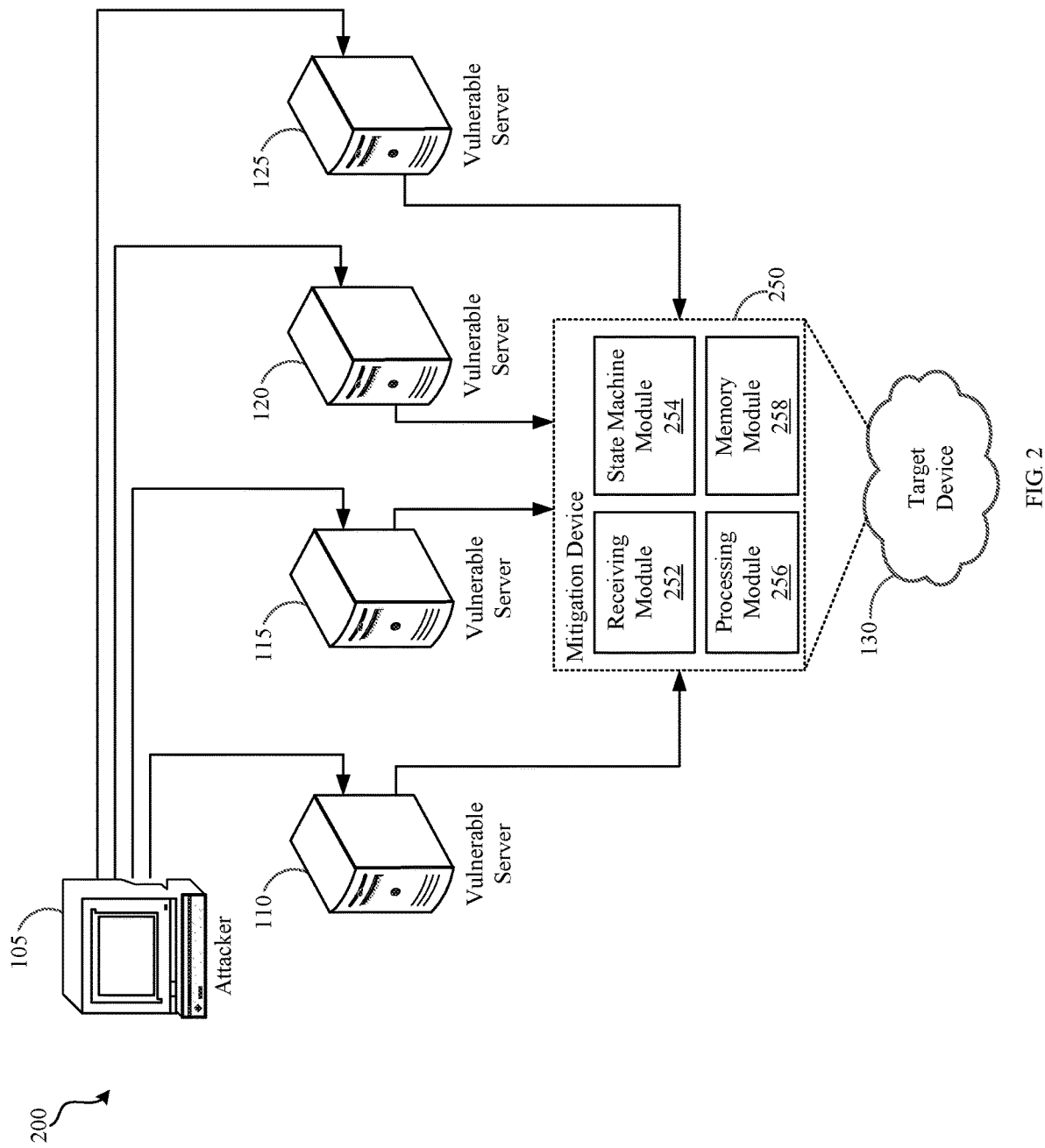
FIG. 2 is a diagram illustrating a network infrastructure incorporating the mitigation device of the present invention for mitigating a DDoS attack, in accordance with an embodiment of the present invention.

With reference to FIG. 2, a system for mitigating a Distributed Denial of Service (DDoS) attack on a target device may include a mitigation device 250, which is positioned between a plurality of vulnerable servers 110, 115, 120, 125 and a target device 130. The mitigation device 250 may include one or more modules implemented at least partially in hardware. The one or more modules may include a receiving module 252, a state machine module 254, a processing module 256 and a memory module 258. The various modules 252, 254, 256 and 258 of the mitigation device 250 are configured to analyze data packets received at the target device 250 from the vulnerable servers 110, 115, 120, 125 and to determine from the analysis of the data packets if the target device 250 is experiencing a potential DDoS attack from an attacker 105. The various modules 252, 254, 256 and 258 of the mitigation device 250 are also configured to drop data packets received at the mitigation device 250 if it is determined that the target device 130 is experiencing a DDoS attack, thereby blocking the transmission of the attacking data packet to the target device 130 to prevent the target device 130 from being overwhelmed and rendered inaccessible by a user of the system.

In operation, the receiving module 252 of the mitigation device 250 receives a plurality of data packets from one or more of the vulnerable servers 110, 115, 120, 125. Each of the plurality of data packets from the vulnerable servers 110, 115, 120, 125 includes a destination address signature and each destination address signature includes at least a data packet destination address which identifies the target device 130 as the destination for the transmitted plurality of data packets. The data packets may conform to one of a plurality of transmission protocols, including but not limited to, Transmission Control Protocol (TCP) or User Datagram Protocol (UDP) and the destination address signature may further include a protocol identifier which identifies the protocol type of the data packet.

Each of the data packets received at the mitigation device 250 includes a destination address signature which includes at least a data packet destination address which identifies the target device 130 that is the destination for the data packet. The destination address signature may further include additional parameters or fields which further define the protocol technical specifications of the data packet. For example, in addition to the data packet destination address, the destination address signature for a particular data packet may include a source address, a sequence number, an acknowledgement number, the window size, a virtual local area network (VLAN) identifier, control flags, a protocol identifier, etc. Selected data packet parameters are stored in the destination address signature for each of the data packets using a plurality of bytes, as is known in the art.

In general, the destination address signature of each data packet includes at least the data packet destination address for the data packet and may further include additional fields. In the present invention, a subset of the fields in the destination address signature may be selected for evaluation and the combination of the fields stored in the destination address signature of each of the plurality of data packets may be compared to the selected fields to see if there is a match and the number of data packets having a destination address signatures that matches may then be counted to determine if the number of occurrences of the match exceeds a destination signature address threshold. If the destination signature address threshold is exceeded, the mitigation device 250 may implement rate limiting of the data packets having the combination of fields that exceeds the destination signature address threshold.

The destination address signatures of the plurality of data packets received at the mitigation device 250 are analyzed using the state machine module 254, the processing module 256 and the memory module 258 to count a number of occurrences of each destination address signature within each of a plurality of consecutive data packet windows. In a specific embodiment, the state machine module 254 may be used to implement a counter for counting a number of occurrences of each destination address signature within each of the plurality of consecutive data packet windows. Each of the data packet windows comprises a plurality of data packets, wherein the number of data packets within each data packet window may be determined by the transmission protocol being used and by the network operating speed. In an exemplary embodiment, a typical TCP window may be 64K bytes, which equates to approximately a 0.5 ms data packet window at a network operating speed of 1 Gbps.

After the number of occurrences of each destination address signature in the plurality of data packet windows have been counted, the mitigation device 250 then classifies each data packet window as a potential attack window if the number of occurrences of any one destination address signature within the data packet window exceeds a destination address signature threshold value. The destination address signature threshold value is configurable and may be customized for different target devices.

After each of the plurality of data packet windows have been classified as either a potential attack window or a non-potential attack window, the mitigation device then utilizes a sliding time window to determine if a sustained DDoS attack is occurring on the target device 130. The sliding time window identifies a subset of the plurality of consecutive data packet windows and the mitigation device 250 determines a total number of potential attack windows within the sliding time window. If the total number of potential attack windows within the sliding time window exceeds a potential attack window threshold value, then the mitigation device 250 concludes that a sustained attack on the target device 130 is occurring and the mitigation device 250 initiates rate limiting of the data packets that are sent to the target device 130. In one embodiment, rate limiting may be implemented at the mitigation device 250 by dropping only the data packets having a destination address signature that matches the destination address signature which has exceeded the destination address threshold value. In one embodiment, a firewall may be implemented in the mitigation device 250 to block the transmission of the data packets to the target device 130, thereby dropping the data packets having a destination address signature matching the destination address signature that has exceeded the destination address signature threshold value in a next data packet window. The mitigation device 250 will continue to count the occurrences of the destination addresses signature in the received plurality of data packets and will continue to drop data packets in subsequent data packet windows as long as a number of potential attack windows continues to exceed the potential attack window threshold value, thereby indicating a sustained attack on the target device 130.

In one embodiment, the potential attack windows are identified using only the data packet destination address stored in the destination address signature. In this embodiment, the number of occurrences of the destination address signature are counted by examining each of the plurality of data packets in the data packet window and counting the occurrences of each of the data packet destination addresses within the plurality of data packets in the data packet window. If the number of occurrences of any of the data packet destination address exceeds a destination address signature threshold, the mitigation device 250 will proceed by rate limiting the data packets received at the mitigation device 250.

In an additional embodiment, the destination address signature for each of the plurality of data packets received at the mitigation device 250 may additionally include other fields in the destination address signature, in addition to the data packet destination address. In this embodiment, the mitigation device 250 may further be configured to count the number of occurrences of the destination address signature in combination with one or more other fields in the destination address signature to determine if the destination address signature exceeds a destination address signature threshold.

In a particular embodiment, the destination address signature for each of the plurality of data packets received at the mitigation device 250 may additionally include a protocol identifier and the mitigation device 250 may be configured to implement rate limiting if the occurrence of a destination address signature exceeds the destination address signature threshold wherein the destination address signature includes both the data packet destination address and the protocol identifier. Since the most commonly used protocols for implementing DDoS attacks are TCP and UDP protocols, the mitigation device 250 may be configured to identify a DDoS attack on a particular target device by counting the occurrences of TCP and/or UDP data packets having a data packet destination address that exceeds the destination address signature threshold. This embodiment may be implemented in either one or two stages.

In a one-stage embodiment for rate limiting TCP and/or UDP packets, the mitigation device 250 may be configured to examine both the protocol identifier and the data packet destination address signature in combination. In this embodiment, if the number of occurrences of a particular data packet destination address in a plurality of TCP and/or UDP data packets exceeds the destination signature address, then the mitigation device 250 may implement rate limiting for TCP and/or UDP data packets received at the mitigation device 250 that have the identified data packet destination address.

In a two-stage embodiment, the mitigation device 250 may be configured to first examine each of the plurality of data packets in the data packet window to determine whether or not each of the plurality of data packets are TCP and/or UDP packets and then the mitigation device 250 may be configured to count the number of occurrences of the data packet destination addresses only within the identified TCP and/or UDP packets. Alternatively, the mitigation device 250 may be configured to first count the number of occurrences of the data packet destination addresses and if the number of occurrences exceeds a predetermined data packet destination address threshold, the mitigation device 250 may then be configured to determine if the data packets having the data packet destination address that exceeds the data packet destination address threshold are also TCP and/or UDP packets. In either of these embodiments, the mitigation device 250 will implement rate limiting based upon the combination of the data packet destination address and the protocol identifier of the data packets exceeding the destination address signature. In this way, only the data packets that are TCP and/or UDP data packets having a data packet destination address that exceeds a data packet destination address threshold will be rate limited and the data packets that do not meet both of these criteria will continue to be received at the mitigation device 250 and transmitted to the target device 130 provided in the data packet destination address of the data packet.

Following the identification of a DDoS attack, the mitigation device 250 will continue to count the occurrences of the destination addresses signature in the received plurality of data packets and will continue to drop data packets in subsequent data packet windows having the identified destination addresses signature as long as a number of potential attack windows continues to exceed the potential attack window threshold value, thereby indicating a sustained attack on the target device 130.

The vulnerable server responsible for transmitting the plurality of data packets to the mitigation device 250 may retransmit any data packets that have been dropped during rate limiting of the data packets by the mitigation device 250. It is common in the art to retransmit an entire TCP data packet window if packet loss has been detected in the window. A typical TCP data packet window is 64K, which equates to approximately 0.5 ms at 1 Gpbs transmission speeds. To minimize the retransmission of data packets that have been dropped, the sliding time window may be configured to allow rate limiting of the data packets over a granularity time slice, such as duration of 0.5 ms at 1 Gpbs. The mitigation device 250 operates at a rate of 1 Gpbs to allow for the examination of all received data packets and provides for rate limiting of the data packets that are determined to include a destination address signature having a number of occurrences that exceeds a destination address signature threshold value.

Figure 3:
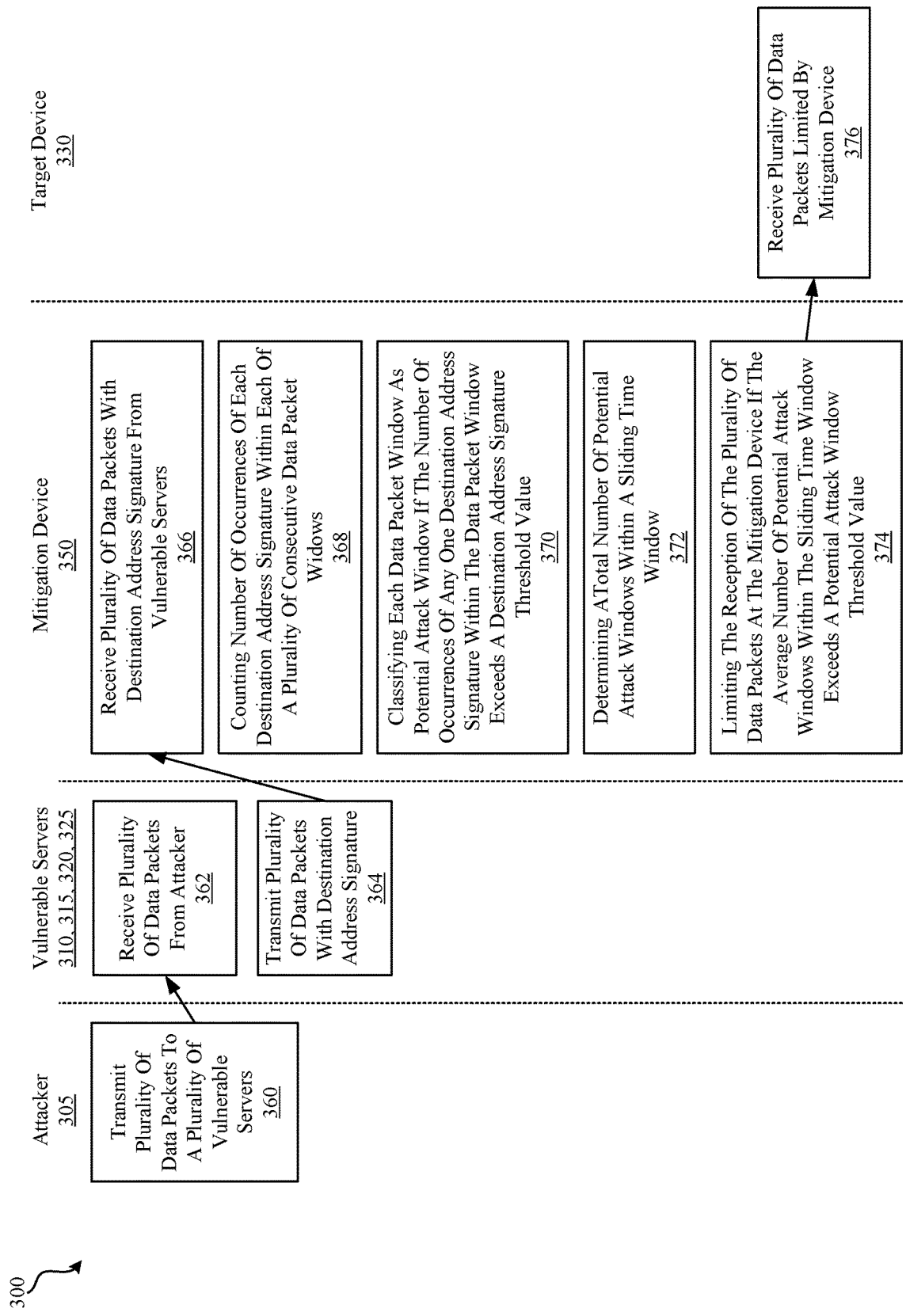
FIG. 3 is a swim-lane diagram of an exemplary process for mitigating a DDoS attack, in accordance with an embodiment of the present invention.

FIG. 3 is a swim-diagram of an exemplary process 300 for mitigating a DDoS attack. For example, the process 300 can be used by a user and implemented by the mitigation device 350, to limit the data packets that are transmitted to a target device 330 when it is determined that the target device 330 is experiencing a DDoS attack from an attacker 305. FIG. 3 illustrates lanes for steps that can be performed by an attacker 305, a plurality of vulnerable servers 310, 315, 320, 325, a mitigation device 350 and a target device 330.

To initiate a DDoS attack on a target device 330, a plurality of data packets are transmitted (360) by the attacker 305 to the plurality of vulnerable servers 310, 315, 320, 325. Each of the plurality of data packets transmitted by the attacker 305 includes a destination address signature. For example, in the case of data packets using the TCP/IP IPv4 protocol, the 32-bit destination address for the data packet may be stored in the Layer 3 header of the data packet.

Each of the vulnerable servers 310, 315, 320, 325 receive the data packets (362) transmitted by the attacker 305 and then proceed to transmit the plurality of data packets, including the destination address signature, (364) to the mitigation device 350. The plurality of data packets received at the mitigation device 350 include the source address of the vulnerable server that transmitted the data packet and the destination address for the data packet.

The plurality of data packets are received (366) at the mitigation device 350 and the mitigation then proceeds to count the number of occurrences of each destination signature within each of the plurality of consecutive data packet windows (368). As is known in the art, a plurality of data packets are transmitted during a specific period of time, herein referred to as a data packet window, which is dependent upon the particular network configuration and the transmission speed. In a particular example, a typical TCP window is 64K bytes, which equates to a data packet window size of approximately 0.5 ms at a network speed of 1 Gpbs.

After the mitigation device 350 has counted the number of occurrences of each data packet destination signature within each of the plurality of consecutive data packet windows (368), the mitigation device 350 then proceeds to classify each data packet window as a potential attack window if the number of occurrences of any one destination address signature within the data packet window exceeds a destination address signature threshold value (370). The destination address signature threshold value can be determined by a user of the mitigation device 350 and may be based upon the specific configuration of a specific target device that is being protected from a DDoS attack.

Classifying data packet windows as potential attack windows allows the mitigation device 350 to identify increased traffic flow to a specific target device 330. Following the classification of the plurality of data packets (370), the mitigation device then implements a sliding time window to determine whether the increased traffic flow to the specific target device 330 is intermittent or sustained. A sustained increase of traffic flow to a target device 350 indicates the existence of a DDoS attack on the target device 330. The duration of the sliding time window is configurable by a user of the mitigation device and defines a predetermined number of data packet windows that have already been classified as potential attack windows or non-potential attack windows. Using the sliding time window over the subset of the plurality of consecutive data packet windows, the mitigation device 350 determines the total number of potential attack windows within the sliding time window (372) and if the total number of potential attack windows within the sliding time window exceeds a potential attack windows threshold value, the mitigation device limits the transmission of the data packets (374) to the target device 330. The target device 330 then receives only the data packets that have been limited (376) by the mitigation device 350, thereby mitigating a DDoS attack on the target device 330. The receipt of data packets may be limited by the mitigation device 350, by either blocking the receipt of data packets at the mitigation device 350 that include a potential attack destination address within a destination address signature having a number of occurrences that exceeds the destination address signature threshold value or alternatively, the mitigation device 350 can limit the data packets by blocking the receipt of TCP or UDP data packets that include a potential attack destination address within the destination address signature that exceeds the threshold value.

Figure 4:
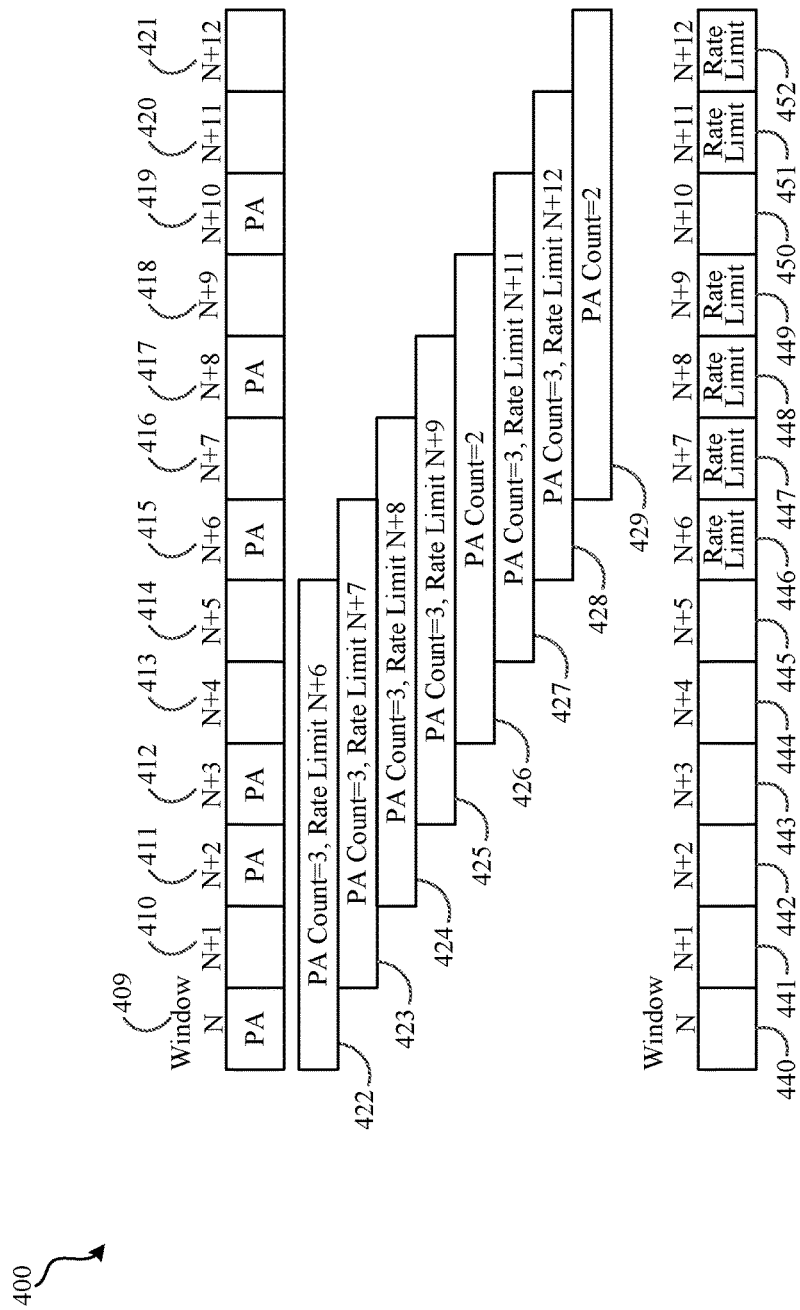
FIG. 4 is a diagram illustrating the use of a sliding time window to identify sustained DDoS attacks, in accordance with an embodiment of the present invention.

FIG. 4 illustrates an exemplary implementation of the process 400 for mitigating a DDoS attack. As shown in FIG. 4, the process 400 includes a plurality of data packet windows 409-421, a plurality of sliding time windows 422-429, and a plurality of rate data packet windows 440-452, some of which have been rate limited by the mitigation device. As previously described, the mitigation device analyzes each of the data packet windows 409-421 to determine if the number of occurrences of a particular destination address signature exceeds a destination address signature threshold value. As shown in FIG. 4, the mitigation device has determined that data packet window "N" 409, "N+2" 411, "N+3" 412, "N+6" 415, "N+8" 417 and "N+10" 419 are potential attack windows because the occurrence of one or more destination addresses signature in these particular data packet windows exceeds the destination address signature threshold value that has been set.

Following the classification of the potential attack windows, the mitigation device continues by determining if the existence of the potential attack windows signifies a sustained DDoS attack on a target device identified by the destination address signature that exceeds the destination address signature threshold value. The mitigation device utilizes a sliding time windows 422-429 to ascertain the existence of a sustained attack. In this exemplary embodiment, the duration of the sliding time windows 422-429 covers 6 data packet windows. As shown, each sliding time window 422-429 cover a subset of the plurality if consecutive data packet windows. In this embodiment, a first sliding time window 422 covers data packet windows 409-414, a second sliding time window 423 covers data packet windows 410-415, etc. As such, is this exemplary embodiment, the sliding time window is shifted the equivalent of one data packet window to the right prior to counting the total number of potential attack windows covered by the sliding time window.

In order to identify a sustained DDoS attack, the mitigation device determines the total number of potential attack windows within each sliding time window. As shown, no rate limiting is initiated in the first 6 received data packet windows 440-445. Following the receipt and classification of more than 6 data packet windows, the mitigation device determines that a total of 3 potential attack windows 409, 411, 412 are covered by the first sliding time window 422. Assuming that the potential attack window threshold is equal to 3, the mitigation device will initiate rate limiting within the data packet window "N+6" 446 as a result of the total number of potential attack windows in the first sliding time window 422 exceeding the potential attack window threshold value. The mitigation device then assesses the next sliding time window 423, which again includes 3 potential attack windows, and the mitigation device initiates rate limiting at data packet window "N+7" 447. Similarly, rate limiting is initiated in data packet window "N+8" 448 and "N+9" 449 because the sliding time windows 424 and 425 that cover the 6 preceding data packet windows include at least 3 potential attack windows. However, it is shown that sliding time window 426 covers only 2 potential attack windows, "N+6" 415 and "N+8" 417, therefore rate limiting of the data packets does not occur in data packet window "N+10" 450. Rate limiting is again initiated in data packet windows "N+11" 451 and "N+12" 452, when the corresponding sliding time windows 428, 429 cover at least 3 potential attack windows. The mitigation device will continue to assess the data packet windows to identify potential attack windows and initiate rate limiting if a sustained attack is discovered using the sliding time windows while data packets are being received at the mitigation. The mitigation device will continue to count the occurrences of destination address signature even during rate limiting of the data packets.

As previously described, the mitigation device of the present invention is configured for classifying each sliding time window of the plurality of consecutive sliding time windows as a potential attack window if the number of occurrences of any one destination address signature within the sliding time window exceeds a destination address signature threshold value. In an additional embodiment, the mitigation device may be configured for identifying one or more highest destination addresses signature based upon the number of occurrences of the destination address signatures within each of a plurality of consecutive sliding time windows. The mitigation device may further be configured for classifying each sliding time window of the plurality of consecutive sliding time windows as a potential attack window if the number of occurrences of any one or more of the highest destination address signatures within the sliding time window exceeds the destination address signature threshold value.

Figure 5:
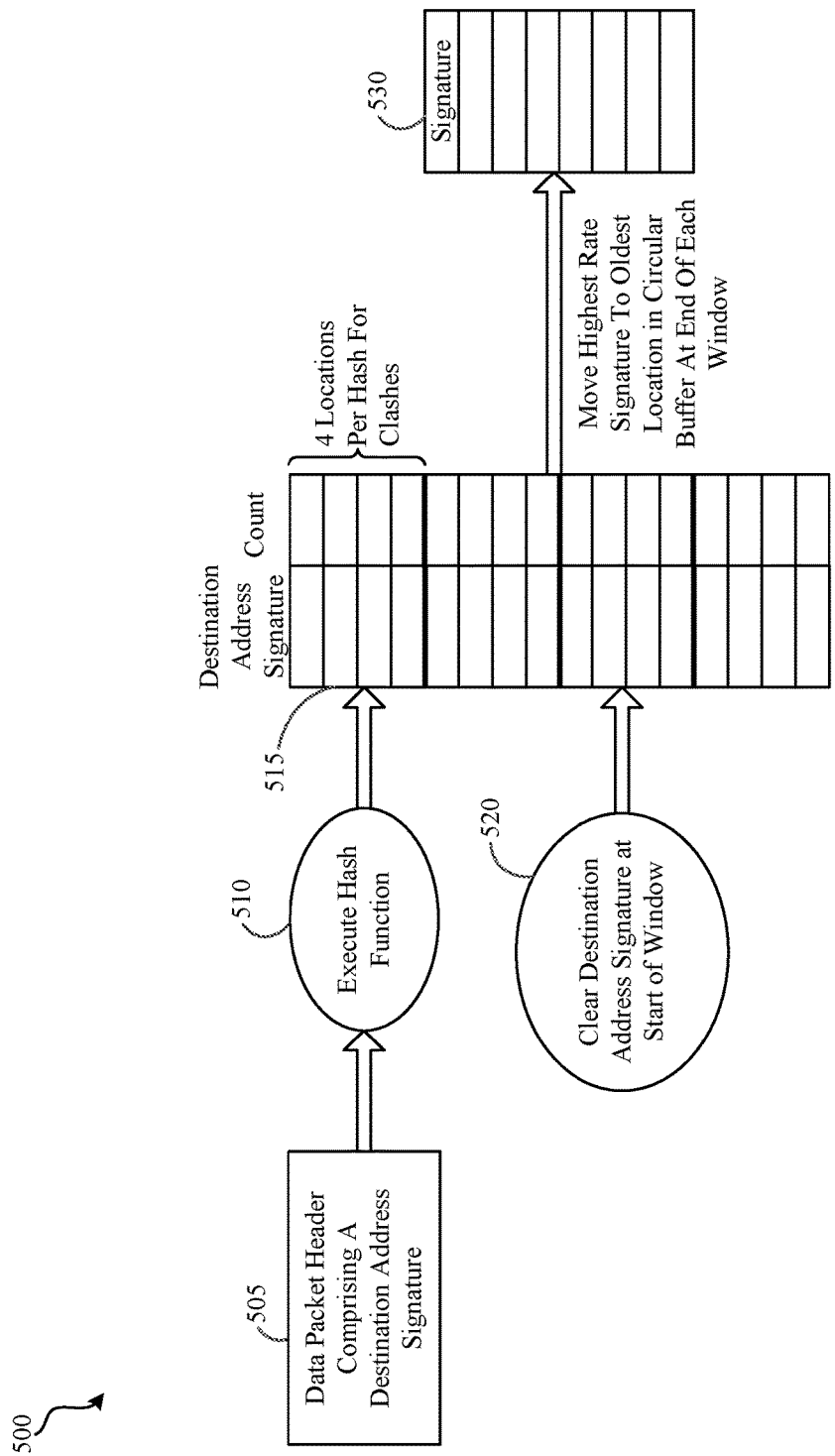
FIG. 5 is a diagram illustrating a hash table and circular buffer for identifying and tracking multiple destination addresses signatures that may indicate a DDoS attack, in accordance with an embodiment of the present invention.

FIG. 5 illustrates an additional exemplary process for mitigating a DDoS attack 500 wherein one or more of the highest destination address signatures are assessed prior to initiating rate limiting of the data packets. As shown in FIG. 5, the mitigation process 500 may include, receiving a data packet window at a mitigation device, wherein each data packet in the data packet windows includes a data packet header comprising at least a destination address and other fields which may be used in the signature 505. The mitigation device may then execute a hash function 510 on the destination address signature to generate a destination signature hash, which is then stored in a hash table 515 along with the total count for number of occurrences of the destination signature hash in the data packet window. The use of a hash table 515 allows for faster searching of particular destination address signatures within the plurality of data packets received at the mitigation device. The hash table 515 may be stored in a memory module, such as the memory module 258 of the mitigation device 250 in FIG. 2 and the hash table 515 is cleared at the start of every window 520. In this exemplary embodiment, 4 locations are reserved for the hash destination signatures, allowing for clashes in the hash table 515. The total size of the hash table 515 required may be determined based upon the data packet window size and the minimum data packet size. For example, with a 0.5 ms data packet window size and a 672 ns minimum 1 Gbps data packet size, destination signature hashes for 74 data packets would need to be stored in the hash table 515, thereby requiring 74×4 locations for each 0.5 ms data packet window at 1 Gbps speeds.

After the destination signature hashes have been stored in the hash table 515, the mitigation process 500 continues by moving the highest rate hashes to the oldest locations in a circular buffer 530 at the end of each data packet window. The circular buffer 530 may be stored in a memory module, such as the memory module 258 of the mitigation device 250 in FIG. 2. The circular buffer 530 stores the most current highest rate hashes and the circular buffer 530 continues to update as more data packet windows are assessed by the mitigation device. As such, the hash table 515 tracks multiple destination address signatures in the plurality of data packet windows and the circular buffer 530 is used to store the hash value of the most commonly occurring destination address signatures that are occurring within the data packets being received, thereby classifying the data packet windows as potential attack windows for a particular destination address signature. The mitigation device then uses the hashes stored in the circular buffer 530 and the sliding time window, as previously described, to determine if the one or more of the destination addresses signatures exceeds a potential attack window threshold. If any of the top destination address signatures stored in the circular buffer 530 results in the potential attack window threshold being exceeded, the mitigation device initiates rate liming of the data packets, as previously described.

FIG. 6 is a flow diagram of a method 600 for mitigating a DDoS attack on a target device.

At operation 605, the method includes receiving a plurality of data packets at a mitigation device, each of the plurality of data packets comprising at least a data packet destination address and the data packet destination address identifying a target device. With reference to FIG. 2, in the present invention, the receiving module 254 of the mitigation device 250 are configured for receiving the plurality of data packets.

At operation 610, the method includes, counting a number of occurrences of each destination address signature within each of a plurality of consecutive time data packet windows. With reference to FIG. 2, in the present invention, the state machine module 254, the processing module 256 and the memory module 258 of the mitigation device 250 are configured for counting a number of occurrences of each destination address signature within each of a plurality of consecutive time data packet windows.

At operation 615, the method includes, classifying each sliding time window of the plurality of consecutive sliding time windows as a potential attack window if the number of occurrences of any one destination address signature within the sliding time window exceeds a destination address signature threshold value. With reference to FIG. 2, in the present invention, the state machine module 254, the processing module 256 and the memory module 258 of the mitigation device 250 are configured for classifying each sliding time window of the plurality of consecutive sliding time windows as a potential attack window if the number of occurrences of any one destination address signature within the sliding time window exceeds a destination address signature threshold value.

At operation 620, the method includes, determining a total number of potential attack windows within the sliding time window. With reference to FIG. 2, in the present invention, the state machine module 254, the processing module 256 and the memory module 258 of the mitigation device 250 are configured for determining a total number of potential attack windows within the sliding time window.

At operation 625, the method includes, limiting the transmission of the plurality of data packets from the mitigation device if the total number of potential attack windows within the sliding time window exceeds a potential attack window threshold value. With reference to FIG. 2, in the present invention, the state machine module 254, the processing module 256 and the memory module 258 of the mitigation device 250 are configured for limiting the transmission of the plurality of data packets from the mitigation device if the total number of potential attack windows within the sliding time window exceeds a potential attack window threshold value.

In various embodiments, the present invention provides a system and method for mitigating a Distributed Denial of Service (DDoS) attack on a target device which utilizes the destination address signature of the data packets to initiate rate limiting. The present invention overcomes the deficiencies known in the art methods which utilized the source address to mitigate a DDoS attack.

In one embodiment, portions of the Distributed Denial of Service (DDoS) mitigation system may be implemented in an integrated circuit as a single semiconductor die. Alternatively, the integrated circuit may include multiple semiconductor die that are electrically coupled together such as, for example, a multi-chip module that is packaged in a single integrated circuit package.

With reference to FIG. 2, In various embodiment, the mitigation device 250 provided by the present invention is positioned between the vulnerable servers 110, 115, 120, 125 and the target device 130 to intercept the data packets transmitted from the plurality of vulnerable servers 110, 115, 120, 125 to the target device 130 and to mitigate a DDoS attack on the target device.

In an additional embodiment, there may be a plurality of target devices and the mitigation device 250 may be positioned between the plurality of vulnerable servers 110, 115, 120, 125 and the plurality of target devices. In this embodiment, the mitigation device 250 intercepts the data packets transmitted from the plurality of vulnerable servers 110, 115, 120, 125 to the target device 130 and mitigates a DDoS attack on one or more of the plurality of target devices.

The mitigation device 250 may be a standalone computing device. Alternatively, the mitigation device 250 may be implemented in a network routing device or a network interface device. In an additional embodiment, the mitigation device 250 may be integrated into the target device 130.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. A method for mitigating a Distributed Denial of Service (DDoS) attack on a target device, the method comprising:

receiving, at a mitigation device, a plurality of consecutive data packet windows, wherein each of the plurality of consecutive data packet windows comprises a plurality of data packets, and wherein each of the plurality of data packets comprises a destination address signature, the destination address signature comprising at least a data packet destination address, wherein each data packet destination address identifies a target device of a plurality of target devices;

examining the destination address signature of each of the plurality of data packets to identify matching destination address signatures, wherein data packets having matching destination address signatures have the same data packet destination address identifying the same target device of the plurality of target devices;

counting a number of occurrences of each matching destination address signature within each of the plurality of consecutive data packet windows to determine how many data packets within each of the plurality of consecutive data packet windows are destined for the same target device;

classifying each data packet window of the plurality of consecutive data packet windows as a potential attack window if the number of occurrences of any one destination address signature within the data packet window exceeds a destination address signature threshold value;

determining a total number of potential attack windows within a sliding time window, the sliding time window comprising a subset of the plurality of consecutive data packet windows; and limiting the transmission of the plurality of data packets from the mitigation device if the total number of potential attack windows within the sliding time window exceeds a potential attack window threshold value.

2. The method of claim 1, wherein the destination address signature of each of the plurality of data packets further comprises one or more additional data packet parameters.

3. The method of claim 1, wherein the destination address signature of each of the plurality of data packets further comprises a protocol identifier.

4. The method of claim 1, wherein the destination address signature of each of the plurality of data packets further comprises a protocol identifier that is selected from a Transmission Control Protocol (TCP) identifier and a User Datagram Protocol (UDP) identifier.

5. The method of claim 1, wherein limiting the transmission of the plurality of data packets from the mitigation device further comprises dropping the data packets of the plurality of data packets received at the mitigation device identified by the destination address signature having a number of occurrences that exceeds the destination address signature threshold value in a next data packet window.

6. The method of claim 1, wherein limiting the transmission of the plurality of data packets from the mitigation device further comprises dropping the plurality of data packets in a next data packet window.

7. The method of claim 1, wherein the target device is a server connected to the internet.

8. The method of claim 1, wherein the mitigation device is implemented at least partially in hardware.

9. The method of claim 1, wherein classifying each consecutive data packet window of the plurality of consecutive data packet windows as a potential attack window if the number of occurrences of any one destination address signature within the data packet window exceeds a destination address signature threshold value further comprises:
identifying one or more highest destination address signatures based upon the number of occurrences of the destination address signatures within each of a plurality of consecutive data packet windows; and
classifying each data packet window of the plurality of consecutive data packet windows as a potential attack window if the number of occurrences of any of the one or more of the highest destination address signatures within the data packet window exceeds the destination address signature threshold value.

10. The method of claim 1, wherein a duration of the sliding time window is configurable.

11. The method of claim 1, wherein a duration of the sliding time window is determined by a receiving data packet rate of the plurality of data packets at the mitigation device and a size of each data packet of the plurality of data packets.

12. The method of claim 1, further comprising, continuing the steps of receiving, counting, classifying and determining after limiting the transmission of the plurality of data packets from the mitigation device.

13. A system for mitigating a Distributed Denial of Service (DDoS) attack on a target device, the system comprising:
one or more modules implemented at least partially in hardware, the one or more modules configured to:
receive a plurality of consecutive data packet windows, wherein each of the plurality of consecutive data packet windows comprises a plurality of data packets, and wherein each of the plurality of data packets comprises a destination address signature, the destination address signature comprising at least a data packet destination address, wherein each data packet destination address identifies a target device of a plurality of target devices;
examine the destination address signature of each of the plurality of data packets to identify matching destination address signatures, wherein data packets having matching destination address signatures have the same data packet destination address identifying the same target device of the plurality of target devices;
count a number of occurrences of each matching destination address signature within each of the plurality of consecutive data packet windows to determine how many data packets within each of the plurality of consecutive data packet windows are destined for the same target device;
classify each data packet window of the plurality of consecutive data packet windows as a potential attack window if the number of occurrences of any one destination address signature within the data packet window exceeds a destination address signature threshold value;
determine a total number of potential attack windows within a sliding time window, the sliding time window comprising a subset of the plurality of consecutive data packet windows; and
limit the transmission of the plurality of data packets from the mitigation device if the total number of potential attack windows within the sliding time window exceeds a potential attack window threshold value.

14. The system of claim 13, wherein the destination address signature of each of the plurality of data packets further comprises one or more additional data packet parameters.

15. The system of claim 13, wherein the destination address signature of each of the plurality of data packets further comprises a protocol identifier.

16. The system of claim 13, wherein the destination address signature of each of the plurality of data packets further comprises a protocol identifier that is selected from a Transmission Control Protocol (TCP) identifier and a User Datagram Protocol (UDP) identifier.

17. The system of claim 13, wherein to limit the transmission of the plurality of data packets from the mitigation device, the one or more modules are further configured to drop the data packets of the plurality of data packets received at the mitigation device identified by the destination address signature having a number of occurrences that exceeds the destination address signature threshold value in a next data packet window.

18. The system of claim 13, wherein to limit the transmission of the plurality of data packets from the mitigation device, the one or more modules are further configured to drop the plurality of data packets in a next data packet window.

19. The system of claim 13, wherein the target device is a server connected to the internet.

20. The system of claim 13, wherein to classify each data packet window of the plurality of consecutive data packet windows as a potential attack window if the number of occurrences of any one destination address signature within the data packet window exceeds a destination address signature threshold value, the one or more modules are further configured to:
identify one or more highest destination address signatures based upon the number of occurrences of the destination address signatures within each of a plurality of data packet windows; and
classify each data packet window of the plurality of consecutive data packet windows as a potential attack window if the number of occurrences of any of the one or more of the highest destination address signatures within the data packet window exceeds the destination address signature threshold value.

21. The system of claim 13, wherein a duration of each of the sliding time window is configurable.

22. The system of claim 13, wherein a duration of the sliding time window is determined by a receiving data packet rate of the plurality of data packets at the mitigation device and a size of each data packet of the plurality of data packets.

23. The system of claim 13, wherein the one or more modules are configured to continue to receive, count, classify and determine after the one or more modules limit the transmission of the plurality of data packets from the mitigation device.

24. A non-transitory computer-readable media having computer-executable instructions for performing a method of running a software program on a computing device for mitigating a Distributed Denial of Service (DDoS) attack on a target device, the computing device operating under an operating system, the method including issuing instructions from the software program comprising:
  receiving, at a mitigation device, a plurality of consecutive data packet windows, wherein each of the plurality of consecutive data packet windows comprises a plurality of data packets, and wherein each of the plurality of data packets comprises a destination address signature, the destination address signature comprising at least a data packet destination address, wherein each data packet destination address identifies a target device of a plurality of target devices;
  examining the destination address signature of each of the plurality of data packets to identify matching destination address signatures, wherein data packets having matching destination address signatures have the same data packet destination address identifying the same target device of the plurality of target devices;
  counting a number of occurrences of each matching destination address signature within each of the plurality of consecutive data packet windows to determine how many data packets within each of the plurality of consecutive data packet windows are destined for the same target device;
  classifying each data packet window of the plurality of consecutive data packet windows as a potential attack window if the number of occurrences of any one destination address signature within the data packet window exceeds a destination address signature threshold value;
  determining a total number of potential attack windows within a sliding time window, the sliding time window comprising a subset of the plurality of consecutive data packet windows; and
  limiting the transmission of the plurality of data packets from the mitigation device if the total number of potential attack windows within the sliding time window exceeds a potential attack window threshold value.

25. The non-transitory computer-readable media of claim 24, wherein the destination address signature of each of the plurality of data packets further comprises one or more additional data packet parameters.

26. The non-transitory computer-readable media of claim 24, wherein the destination address signature of each of the plurality of data packets further comprises a protocol identifier.

27. The non-transitory computer-readable media of claim 24, wherein the destination address signature of each of the plurality of data packets further comprises a protocol identifier that is selected from a Transmission Control Protocol (TCP) identifier and a User Datagram Protocol (UDP) identifier.

28. The non-transitory computer-readable media of claim 24, wherein limiting the transmission of the plurality of data packets from the mitigation device further comprises dropping the data packets of the plurality of data packets received at the mitigation device identified by the destination address signature having a number of occurrences that exceeds the destination address signature threshold value in a next data packet window.

29. The non-transitory computer-readable media of claim 24, wherein limiting the transmission of the plurality of data packets from the mitigation device further comprises dropping the plurality of data packets in a next data packet window.

30. The non-transitory computer-readable media of claim 24, wherein the mitigation device is implemented at least partially in hardware.

31. The non-transitory computer-readable media of claim 24, wherein classifying each data packet window of the plurality of consecutive data packet windows as a potential attack window if the number of occurrences of any one destination address signature within the data packet window exceeds a destination address signature threshold value further comprises:
  identifying one or more highest destination address signatures based upon the number of occurrences of the destination address signatures within each of a plurality of consecutive data packet windows; and
  classifying each sliding time window of the plurality of consecutive sliding time windows as a potential attack window if the number of occurrences of any of the one or more of the highest destination address signatures within the data packet window exceeds the destination address signature threshold value.

* * * * *